(12) United States Patent
Brock

(10) Patent No.: US 6,243,962 B1
(45) Date of Patent: Jun. 12, 2001

(54) BORING APPARATUS WITH SHAFT MOUNTED DIAMETER GAGE

(75) Inventor: James R. Brock, Livonia, MI (US)

(73) Assignee: Samsomatic, Ltd., Plymouth, MI (US)

( * ) Notice: Subject to any disclaimer, the term of this patent is extended or adjusted under 35 U.S.C. 154(b) by 0 days.

(21) Appl. No.: 09/248,377

(22) Filed: Feb. 10, 1999

(51) Int. Cl.$^7$ .................................................. G01B 5/12
(52) U.S. Cl. ............................................. 33/542; 73/37.9
(58) Field of Search .................................. 33/542, 543.1, 33/544; 73/37.9, 37.5

(56) References Cited

U.S. PATENT DOCUMENTS

| | | | |
|---|---|---|---|
| 2,355,316 | * 8/1944 | Mestas | 33/542 |
| 2,669,864 | * 2/1954 | Brewster | 73/37.9 |
| 2,797,576 | * 7/1957 | Haines | 73/37.9 |
| 2,821,049 | 1/1958 | Harris, Jr. | 51/34 |
| 2,851,783 | * 9/1958 | Peras | 33/542 |
| 3,059,381 | 10/1962 | Greening et al. | 51/34 |
| 3,494,078 | 2/1970 | Miyamoto | 51/165 |
| 3,864,054 | 2/1975 | Eysel | 408/147 |
| 5,152,166 | 10/1992 | Brock et al. | 73/37.9 |

OTHER PUBLICATIONS

Elastic Deformation Improves Micropositioning, Design News, Feb. 1, 1982.
Heller Machine Tools Ltd. Internet Advertisement (Date Unknown).

\* cited by examiner

Primary Examiner—Christopher W. Fulton
(74) Attorney, Agent, or Firm—Young & Basile, P.C.

(57) ABSTRACT

Apparatus for forming and measuring a bore includes a rotating shaft with one or more metal cutting tools disposed on a cutting head and a non-contact, pneumatic gaging device mounted on the shaft for rotation therewith. The measuring device is advanced into the bore formed by the tools so that it measures the inner diameter of the bore as the rotating shaft is advanced into the bore during the cutting stroke. Accordingly, a single stroke of the boring apparatus serves both to form a desired internal diameter and to measure the diameter formed during the cutting stroke. In a preferred embodiment of the invention, the tools are held by a positioning device which allow the tools to be moved radially with respect to the shaft so that the diameter of the bore formed by the tools may be varied. If the measured diameter deviates from the desired diameter, the positioning means repositions the tools as necessary to achieve the desired bore diameter on a subsequent cutting stroke.

20 Claims, 2 Drawing Sheets

BORING APPARATUS WITH SHAFT MOUNTED DIAMETER GAGE

FIELD OF THE INVENTION

The present invention relates to a method and apparatus for machining the interior diameter of a cylindrical bore, and more particularly to such a method and apparatus utilizing a non-contact gage mounted on the boring shaft to measure the diameter of the bore.

BACKGROUND OF THE INVENTION

It is known to use non-contact gages to measure critical dimensions of precision workpieces after intermediate or final machining steps have been accomplished. Measuring the workpieces is desirable to monitor the quality of the workpieces being produced, and also can provide information that may be used to extend the service life of the machining tools being employed.

One type of non-contact gaging device comprises a small-diameter nozzle positioned in close proximity to the workpiece surface to be measured. Compressed air is supplied to the nozzle and the escape of pressure from the nozzle is throttled by the workpiece. By measuring the back-pressure at the nozzle it is possible to determine with a high degree of accuracy the distance between the workpiece surface and the nozzle. One of the advantages of such a pneumatic gage is that a continuous stream of measurements may be taken as the gage moves relative to the workpiece.

U.S. Pat. No. 5,152,166 discloses a pneumatic measuring device wherein the gage is mounted on a rotating shaft which is inserted into a bore after the forming tool has been withdrawn therefrom. The nozzle of the gage is directed radially outward so that it describes a spiral pattern over the inner surface of the bore as the rotating shaft is advanced into the bore. The pneumatic gage can not be inserted into the bore until after the tool which formed the bore has been withdrawn.

U.S. Pat. No. 3,059,381 discloses an apparatus for honing the interior surface of a machined bore and having a pneumatic gaging device for monitoring the diameter of the bore. The gaging device is mounted at the end of an arm which extends adjacent the outer surface of a rotating shaft to which honing stones are fixed. During operation of the machine, the rotating shaft is repeatedly inserted into and withdrawn from the bore, the honing stones gradually increasing the internal diameter of the bore with each stroke. The arm carrying the pneumatic gage is also inserted into the bore with each stroke of the shaft so that the gage is brought into close proximity to the inner surface of the bore at one point on its circumference and takes a measurement of the bore diameter at that point. When the gage senses the desired finished diameter, the machine automatically terminates the honing process.

SUMMARY OF THE INVENTION

It is an objective of this invention to provide a method and apparatus for forming and measuring a cylindrical bore with a single stroke of a rotating shaft.

This objective is achieved by a boring apparatus having a rotating shaft with one or more metal cutting tools and a non-contact measuring device attached thereto for rotation with the shaft. By locating the measuring device on the shaft along with the cutting tools, the measuring device is advanced into the bore formed by the tools so that it is positioned to measure the inner diameter of the bore as the rotating shaft is advanced into the bore during the cutting stroke. Accordingly, a single stroke of the boring apparatus serves both to form a desired internal diameter and to measure the diameter formed during the cutting stroke. This avoids the more time-consuming and complicated procedure known in the prior art which requires the boring shaft to withdrawn from the bore and subsequent insertion of a separate gaging device.

It is a further objective of this invention to provide a method and apparatus for forming a cylindrical bore in a workpiece, measuring the diameter of the bore, and adjusting the position of the cutting tool in response to the measured diameter.

This objective is achieved by a boring machine in which a non-contact measuring device is mounted on a rotating shaft along with one or more tools which are held in positioning means for moving the tools radially with respect to the shaft so that the diameter of the bore formed by the tools may be varied. The tools are held in a first position intended to produce a desired diameter during a first cutting stroke as they are advanced through the bore. The measuring device is inserted into the bore during or at the end of the stroke so that it may determine the diameter formed by the tools. If the measured diameter deviates from the desired diameter, the positioning means repositions the tools as necessary to achieve the desired bore diameter on a subsequent cutting stroke.

The tools may be repositioned radially outward prior to the shaft and tools being withdrawn through the bore, thereby executing a second cutting stroke which enlarges the bore to the desired diameter. In the alternative, the tools may be retracted so that they do not contact the interior of the bore as the shaft is withdrawn, the tools being repositioned to form the desired diameter on subsequent bores.

In a preferred embodiment of the invention, the measuring device is a pneumatic gage mounted in a housing which projects radially outward a short distance from the circumferential surface of the shaft. The gage is adjustable in a radial direction with respect to the shaft in order to vary the range of diameters that may be measured. Air pressure is supplied to the gage through a passage extending through the interior of the shaft. The movable tools are actuated by a pneumatic/hydraulic positioning system which is also supplied with air through the passage.

DETAILED DESCRIPTION OF THE PREFERRED EMBODIMENT

Figure 1:
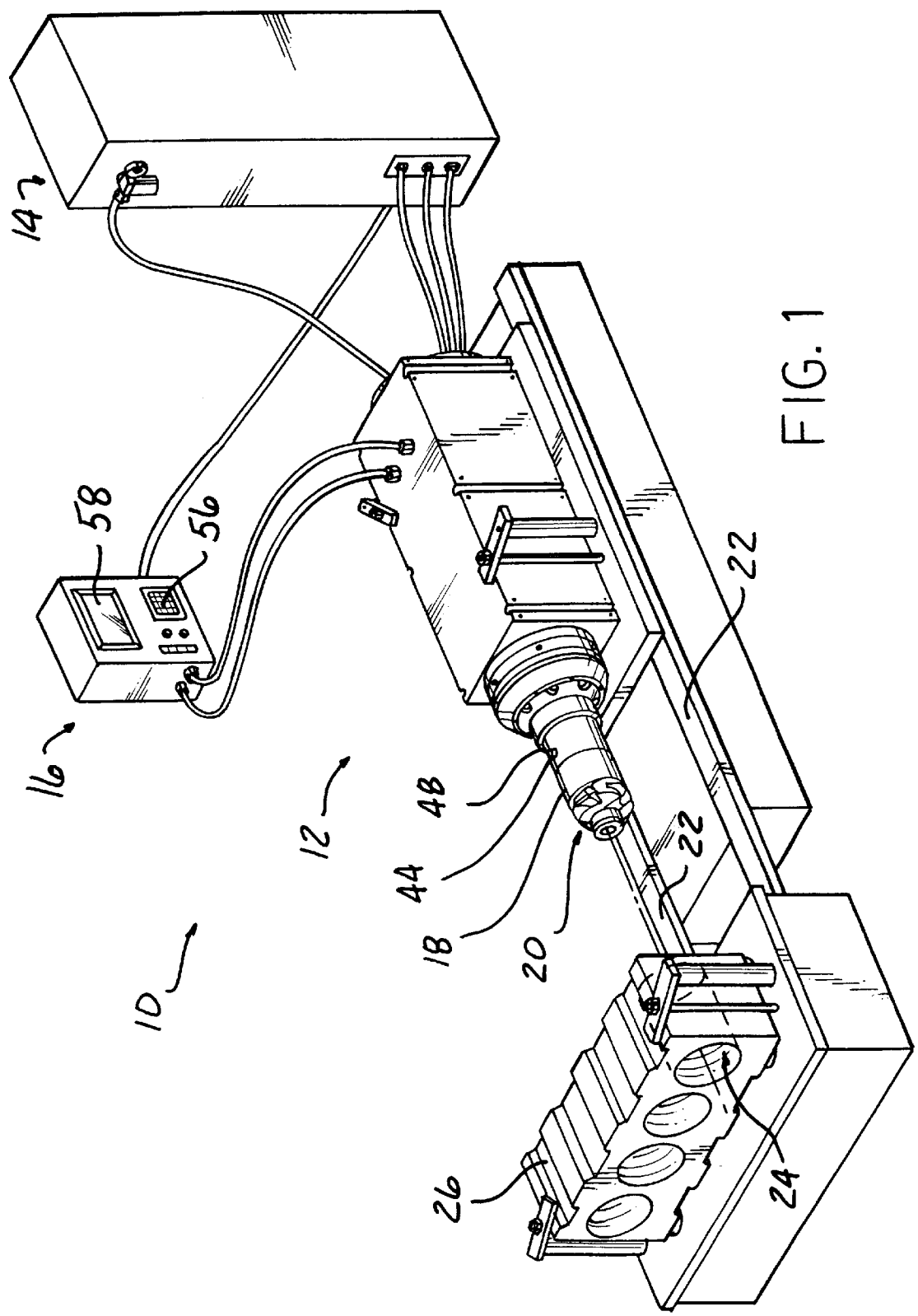
FIG. 1 is a perspective view of a boring apparatus according to the present invention along with a workpiece to be bored.
Figure 2:
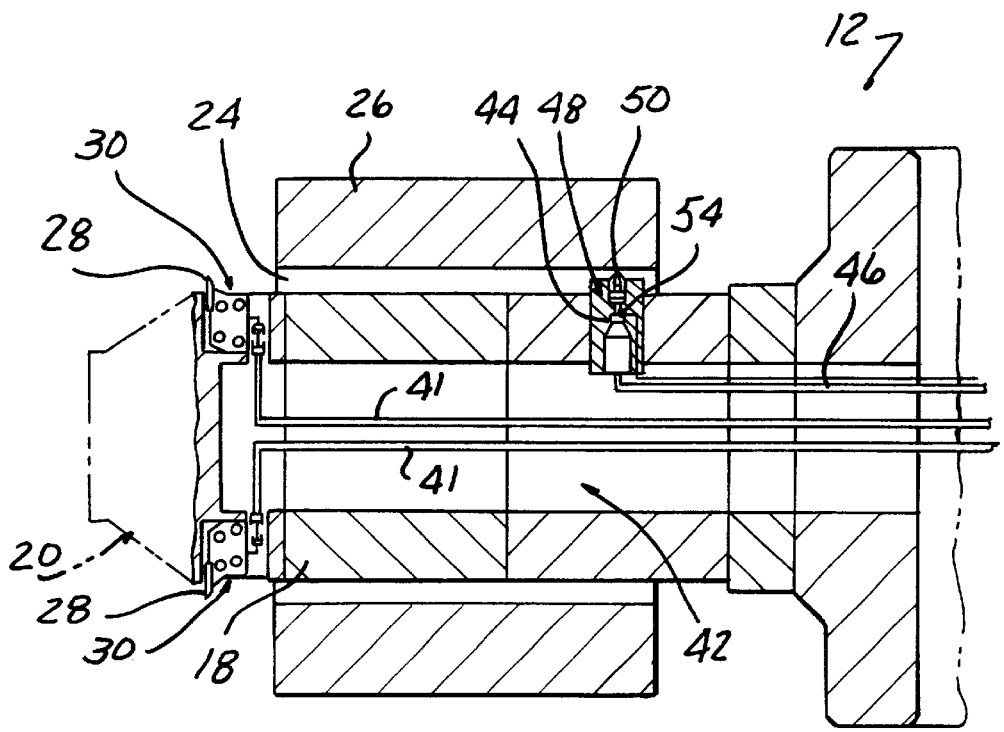
FIG. 2 is a cross-sectional view of the boring tool of FIG. 1 inserted into a bore in the workpiece.
Figure 3A:
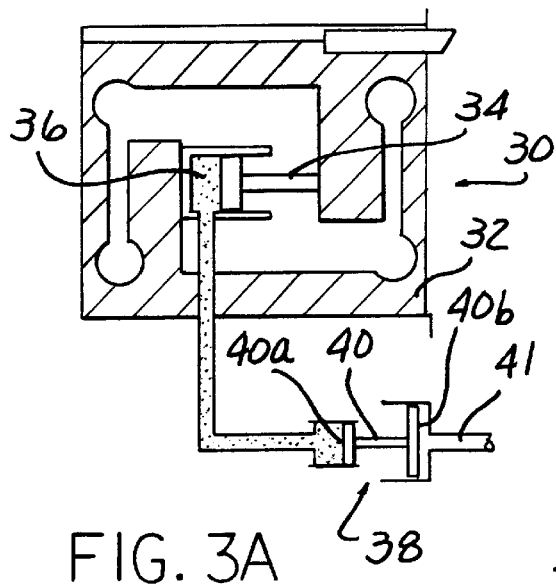
FIG. 3A is a schematic view of a portion of a tool positioning system of the type employed in the invention apparatus.
Figure 3B:
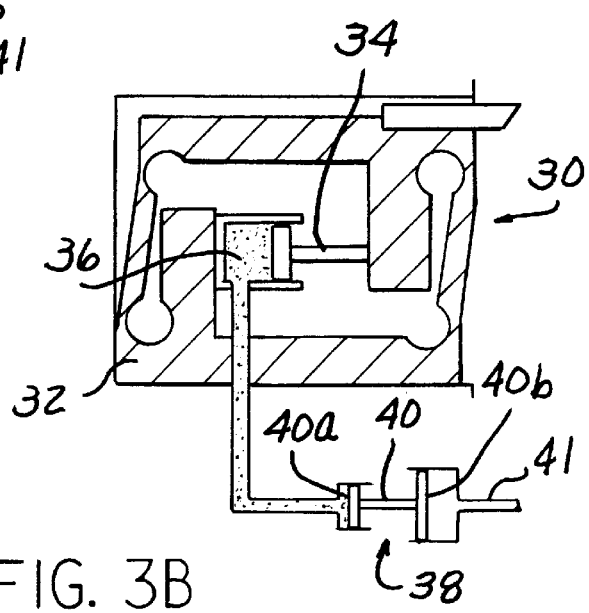
FIG. 3B is a schematic view of the tool positioning system in an extended position.

As seen in FIGS. 1 and 2, a boring apparatus 10 according to the present invention comprises a boring machine 12, a power supply unit 14 connected with the boring machine 12 to supplying electrical and pneumatic power thereto, and a control unit 16 electrically connected with both the boring machine 12 and the power supply unit 14. The boring machine 12 has a rotating shaft 18 with a cutting head 20 disposed at its end and is linearly movable along guide rails 22 so that the shaft may be advanced into a cylindrical bore 24 formed in a workpiece 26, as is well known in the machining art.

The cutting head 20 has a plurality of tools 28 for removing material from the interior of the bore 24 spaced about its circumference. The tools 28 are movably mounted on the cutting head 20 by a pneumatic/hydraulic tool positioning system 30 (see FIG. 2) of the type known in the art. The tool positioning system 30 allows the tools 28 to be individually adjusted radially inward and outward with respect to the cutting head 20 to vary the diameter of the bore 24 formed by the boring apparatus 10.

Each of the tools 28 is mounted to a parallel beam actuator 32 which houses a small hydraulic cylinder 34 such that extension and retraction of the cylinder causes deformation of the actuator 32 and resulting relative linear motion between two parallel faces of the actuator.

A hydraulic reservoir 36 associated with each cylinder is pressurized by a pneumatic/hydraulic amplifier 38 comprising a piston 40 having a first face 40a in contact with the hydraulic fluid and an opposite second face 40b to which pneumatic pressure is applied. The second face 40b of the piston has a surface area on the order of fifty times greater than that of the first face 40a, and the pneumatic pressure is multiplied by the same ratio in the hydraulic portion of the system. Accordingly, relatively low pneumatic pressure will generate a force in the hydraulic cylinder 34 sufficient to deflect the parallel beam actuator 32 and move the tool 28. The actuators 32 and the amplifiers 38 are all located in or on the cutting head 20, and pneumatic pressure is supplied to the amplifiers through ducts or conduits 41 which extend through an axial passage 42 of the shaft 18. A tool positioning system which operates in a similar manner is disclosed in U.S. Pat. No. 3,977,194.

A hollow cylindrical housing 44 extends from the circumferential surface of the shaft 18 and connects with the axial passage 42 of the shaft 18 through a radial duct 46. A pneumatic gage 48 is contained within the housing 44 and is manually adjustable in a radial direction with respect to the shaft 18. The pneumatic gage 48 is supplied with pressurized air through a duct 46 extending through the axial passage 42 of the shaft 18.

As is known in the art, the gage 48 has an orifice 50 on its radially outermost surface and operates according to the principle of the nozzle reflecting plate system, wherein when the orifice 50 is closely adjacent to the surface of the workpiece 26 the surface creates a back-pressure at the orifice. The orifice 50 is supplied with a constant air pressure through the duct 46 and a pressure transducer 54 monitors the pressure upstream from the orifice, this pressure being proportional to the distance between the orifice 50 and the workpiece 26 surface. Such a pneumatic gage 48 provides an extremely accurate measurement of the distance between the gage 48 and the surface of a workpiece 26 without any physical contact.

The control unit 16 has input/output means comprising, for example, a key pad 56 and a CRT or LCD 58 to allow an operator (not shown) to input the desired dimensional parameters to be achieved by the boring machine 12 and monitor actual performance. The unit 16 monitors tool position, receives signals from the pressure transducer 54 which it converts to workpiece dimensional data, and performs statistical analysis on the data. The data is used to control the tool positioning system 30 in the manner described hereinbelow.

During operation of the invention boring apparatus 10, the shaft 18 is rotated at high speed and the boring machine 12 is advanced along the guide tracks 22 so that the cutting head 20 is inserted into the bore 24 of the workpiece 26. The tools 28 are controlled by the tool positioning system 30 so that one or more of the tools contact the interior of the bore 24 to remove material therefrom and enlarge the bore diameter.

The boring machine 12 is advanced until the pneumatic gage 48 enters the bore 24 and is adjacent an entry end of the bore and the cutting head 20 has passed out the far end of the bore, as shown in FIG. 2. When the gage 48 is within the bore 24, a pressure reading is taken by the transducer 54 and relayed to the control unit 16 where it is converted to a radial distance, thereby allowing calculation of the diameter of the bore 24. The shaft 18 continues to rotate as the pressure reading is taken so that the gage 48 is swept around the entire circumference of the bore 24. This allows the invention apparatus to determine the "roundness" of the bore 24 interior, comparing this value to an acceptable value stored in the control unit 16 for quality checking purposes.

For some machining applications, it may be desirable to position the gage 48 farther forward on the shaft 18 and in closer proximity to the cutting head 20. Such a placement allows the gage 48 to be advanced into the bore 24 prior to the tools 28 exiting the far end of the workpiece 26. Further advancing the shaft 18 into the bore 24 allows the gage 48 to take measurements deeper in the bore 24.

In one mode of operation of the invention apparatus, the diameter of the bore 24 determined by the gage 48 after the advancing or "through" stroke of the cutting head 20 is compared by the control unit 16 with a desired diameter that was expected to be produced by the tools 28 in the reference position. If this deviation for any individual workpiece exceeds an allowable value, that workpiece may be flagged as a reject. The control unit 16 can also be used to monitor trends in this dimensional deviation over the course of machining many workpieces to track various machine performance parameters such as tool wear and thermal expansion. This trend analysis allows the tools 28 to be repositioned or replaced as necessary to prevent the quality of the workpieces from falling outside of allowable tolerances. When operating in this mode, the tools 28 are preferably repositioned radially inward prior to the boring machine 12 being moved rearwardly to withdraw the shaft 18 and cutting head 20 from the bore 24. This ensures that the tools 28 do not drag along the inside of the bore 24 as the head is withdrawn.

In a second mode of operation, the first or through stroke by the cutting head 20 is accomplished with one or more of the tools 28 positioned to bore the workpiece 26 to a diameter slightly smaller than the desired finished diameter. The diameter of the bore 24 is then measured by the gage 48 as described above, and the deviation between the measured diameter and the desired diameter is determined by the control unit 16. The control unit 16 then instructs the tool positioning system 30 to adjust the position of one or more of the tools 28 so as to increase the outer diameter of the cutting head 20 as necessary to achieve the desired diameter. This adjustment of the tools 28 occurs as the shaft 18 and cutting head 20 continue to rotate at full operating speed.

The boring machine 12 is then moved back along the tracks so that the shaft 18 and cutting head 20 are withdraw from the workpiece bore 24, thus executing a second or back cutting stroke. On this back stroke, the tools 28 engage the interior of the bore 24 to remove the correct amount of material to result in the desired interior bore diameter. In this mode, the through stroke of the cutting head 20 is a rough-bore operation which leaves the internal diameter smaller than the desired diameter by a small amount, and the back stroke of the cutting head 20 serves as a finish-bore which brings the internal diameter to the desired diameter with a high degree of precision.

Each of the tools 28 may be individually controlled by the tool positioning system 30 so that certain of the tools 28 may be used for the rough-bore and others for the finish-bore. For example, all but one of the tools 28 may be positioned outward to engage the workpiece 26 on the rough-bore stroke, and at the end of the stroke those tools are retracted and the remaining tool is extended to engage the workpiece on the finish-bore stroke.

While the invention has been described in connection with what is presently considered to be the most practical and preferred embodiment, it is to be understood. that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for forming a diameter of a bore comprising:

at least one movable cutting tool mounted on a rotatable shaft at a predetermined position along a longitudinal axis of the shaft;

means for moving the at least one cutting tool radially relative the shaft as the shaft rotates; and means for measuring the diameter of the bore with a non-contact dimensional measuring device mounted on the shaft and spaced longitudinally from the cutting tool relative to the shaft.

2. The apparatus of claim 1 further comprising:

means for actuating the moving means in response to, at least in part, a measurement taken by the measuring means.

3. The apparatus of claim 1 wherein the non-contact dimensional measuring means comprises a pneumatic gaging device.

4. The apparatus of claim 3 wherein the pneumatic gaging device is movable in a radial direction with respect to the shaft.

5. The apparatus of claim 3 wherein the pneumatic gaging device is supplied with fluid at a predetermined pressure through a passage extending along the longitudinal axis of the shaft.

6. The apparatus of claim 3 wherein the actuating means comprises a parallel beam actuator.

7. An apparatus for forming a diameter of a bore comprising:

a shaft having a hollow passage extending along a longitudinal axis thereof;

means for rotating the shaft about the axis and for moving the shaft along the axis into and out of the bore;

at least one tool attached to the shaft for removing material from an inside surface of the bore as the shaft rotates and is moved axially with respect to the bore;

a pneumatic gaging device for non-contact dimensional measurement of the inside surface of the bore, the gaging device disposed on the shaft spaced longitudinally from the at least one tool relative to the shaft for insertion into the bore along with the tool and being supplied with pressure through the axial passage of the shaft; and means for positioning the tool radially relative to the shaft in response at least in part to a measurement of the bore taken by the gaging device.

8. The apparatus of claim 7 wherein the positioning means comprises a parallel beam actuator.

9. The apparatus of claim 8 wherein the pneumatic gaging device is movable in a radial direction with respect to the shaft.

10. A method of forming a diameter of a bore comprising the steps of:

mounting at least one movable cutting tool on a rotatable shaft at a predetermined position along a longitudinal axis of the shaft;

moving the at least one cutting tool radially relative to the shaft as the shaft rotates; and measuring the diameter of the bore with a non-contact dimensional measuring device mounted on the shaft and spaced longitudinally apart from the cutting tool relative to the shaft.

11. The method of claim 10 further comprising the step of:

controlling the positioning step to be performed in response to, at least in part, the measurement taken in the measuring step.

12. The method of claim 11 further comprising the steps of:

advancing the rotating shaft into the bore with the cutting tool mounted in a first position; and withdrawing the rotating shaft from the bore with the tool in a second position to enlarge the diameter of the bore.

13. The method of claim 12 further comprising the step of:

positioning the tool in the second position after the shaft and tool have been withdrawn from the bore.

14. The method of claim 11 wherein the controlling step further comprises the step of:

coordinating the positioning step and the measuring step with an electronic control unit.

15. The method of claim 10 wherein the moving step further comprises the step of:

actuating the movement of the at least one cutting tool with a parallel beam actuator driven by a force amplifying means.

16. A method of forming a diameter of a bore comprising the steps of:

advancing a rotating shaft having a cutting tool mounted thereon in a first position into the bore to form a first diameter;

advancing a non-contact gaging device spaced longitudinally from the cutting tool on the rotating shaft into the bore;

measuring the first diameter with the non-contact gaging device;

moving the tool to a second position relative to the shaft if the first diameter is smaller than a desired diameter by greater than a minimum allowable value; and withdrawing the rotating shaft from the bore to form the desired internal diameter.

17. The method of claim 16 wherein the measuring step further comprises the step of gaging the diameter of the bore with a pneumatic gaging device.

18. The method of claim 17 further comprising the step of:
moving a second movable cutting tool, mounted on the shaft, radially relative to the shaft such that the diameter of the bore formed in a first stage by the second movable cutting tool and in a second stage by the at least one movable cutting tool.

19. The method of claim 16 further comprising the step of adjusting the position of the non-contact gaging device along a radial axis of the rotating shaft in order to establish the desired internal diameter.

20. The method of claim 16 wherein the advancing step further comprises the step of positioning the non-contact gaging device at a point immediately adjacent to an entry of the bore.

* * * * *